US010917412B2

(12) United States Patent
Chow et al.

(10) Patent No.: US 10,917,412 B2
(45) Date of Patent: Feb. 9, 2021

(54) AUTHENTICATION AND RISK ASSESSMENT THROUGH HEADER INJECTIONS

(71) Applicant: PAYPAL, INC., San Jose, CA (US)

(72) Inventors: Scott Chow, San Francisco, CA (US); Alex Gong, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 956 days.

(21) Appl. No.: 15/199,912

(22) Filed: Jun. 30, 2016

(65) Prior Publication Data

US 2017/0324762 A1 Nov. 9, 2017

Related U.S. Application Data

(60) Provisional application No. 62/332,440, filed on May 5, 2016.

(51) Int. Cl.
| | |
|---|---|
| *H04L 29/06* | (2006.01) |
| *H04W 12/06* | (2021.01) |
| *H04W 12/00* | (2021.01) |
| *H04W 12/63* | (2021.01) |
| *H04W 12/67* | (2021.01) |
| *H04W 12/71* | (2021.01) |
| *H04W 12/72* | (2021.01) |

(52) U.S. Cl.
CPC ............ *H04L 63/105* (2013.01); *H04L 69/22* (2013.01); *H04W 12/06* (2013.01); *H04L 63/0876* (2013.01); *H04L 63/107* (2013.01); *H04W 12/63* (2021.01); *H04W 12/67* (2021.01); *H04W 12/71* (2021.01); *H04W 12/72* (2021.01)

(58) Field of Classification Search
CPC . H04L 63/105; H04L 63/107; H04L 63/0876; H04L 69/22; H04W 12/06
See application file for complete search history.

(56) References Cited

U.S. PATENT DOCUMENTS

| | | | |
|---|---|---|---|
| 2005/0097320 A1* | 5/2005 | Golan ..................... | G06F 21/40 713/166 |
| 2009/0024526 A1* | 1/2009 | Erickson ................ | G06Q 20/40 705/44 |
| 2009/0300066 A1* | 12/2009 | Guo ..................... | H04L 29/1216 |
| 2012/0130898 A1* | 5/2012 | Snyder ................... | G06Q 20/32 705/44 |
| 2012/0157042 A1* | 6/2012 | McCanna ........... | H04L 12/1414 455/407 |
| 2014/0245376 A1* | 8/2014 | Hibbert .................. | H04L 63/20 726/1 |

(Continued)

FOREIGN PATENT DOCUMENTS

WO WO-2017010895 A1 * 1/2017 ........ H04W 12/1206

OTHER PUBLICATIONS

"Disclosed Anonymously, Method and Apparatus for Mobile Identity Authentication, Mar. 29, 2010, IP.com Prior Art Database Technical Disclosure, p. 1-4" (Year: 2010).*

*Primary Examiner* — Neha Patel
*Assistant Examiner* — Courtney Patrice Jones
(74) *Attorney, Agent, or Firm* — Haynes and Boone, LLP (57) ABSTRACT

A system for implementing header enrichment or header injections in proprietary networks for authenticating users, conducting user risk assessments, and obtaining user information.

16 Claims, 10 Drawing Sheets

(56) References Cited

U.S. PATENT DOCUMENTS

| | | | |
|---|---|---|---|
| 2014/0359777 A1* | 12/2014 | Lam | G06F 21/577 |
| | | | 726/25 |
| 2015/0128240 A1* | 5/2015 | Richards | H04L 63/0861 |
| | | | 726/7 |
| 2016/0050192 A1* | 2/2016 | Banerjee | H04L 63/08 |
| | | | 726/6 |
| 2016/0050259 A1* | 2/2016 | Banerjee | H04L 67/10 |
| | | | 713/168 |
| 2016/0080355 A1* | 3/2016 | Greenspan | G06F 21/51 |
| | | | 726/7 |
| 2016/0173483 A1* | 6/2016 | Wong | H04W 12/0608 |
| | | | 726/9 |
| 2017/0085550 A1* | 3/2017 | Durham, III | H04L 63/08 |
| 2017/0116596 A1* | 4/2017 | Tsui | G06Q 20/322 |
| 2017/0171200 A1* | 6/2017 | Bao | H04L 9/3213 |
| 2018/0077192 A1* | 3/2018 | Tan | H04L 63/08 |

\* cited by examiner

AUTHENTICATION AND RISK ASSESSMENT THROUGH HEADER INJECTIONS

CROSS-REFERENCE TO RELATED APPLICATION

This application claims priority to U.S. Provisional Patent Application No. 62/332,440, filed May 5, 2016, all of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure generally relates to user authentication, and more specifically, securely managing account information through header injections in network communications.

BACKGROUND

Traditionally, requesting a user to provide information through manual data entry is arduous, especially on mobile devices. Mobile devices are not generally geared for manually entering information. Mobile devices usually have a touch screen rather than a physical keyboard, and the touch screen is usually fairly small, which leads to a lot of typographical errors. As such, manual data entry beyond a few characters can be cumbersome. Thus, it would be beneficial if there was a way to reduce manual data entry in a secure manner while also reducing the risk of fraud.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if one or more features would make an embodiment non-functional.

In some examples, a system for securely sharing user information through carrier injected headers is provided. Often times, service providers request user information from a user for one or more services, such as for creating an account and/or authorizing the user for a service. However, this information is usually manually provided by the user which has the user providing the same information manually over and over again. By using carrier injected headers, user information can be shared without the user having to manually enter the information. Instead, carriers can provide the information on behalf of the user. This system is particularly advantageous over other forms of user information sharing because carriers and user devices associated with the carriers can provide other information about a user and/or user device. This other information can be used to determine the risk of sharing user information and assess whether there is an unacceptable level of risk for sharing user information. There is an additional level of security when a system can determine that the user information that is being shared is being conducted on a user device associated with the user which is on a carrier network associated with the user, and that the subscription to the carrier network is also associated with the user. For example, mobile phones are a very personal device with several levels of security, thus a system can predict with some level of confidence that the user of the user device is the same person that is the subscriber of the mobile phone services with a carrier. Additionally, the user of a mobile phone, with use overtime, establishes a digital fingerprint or profile of the user and the system can use that digital fingerprint to determine that the user of the user device is the same as the subscriber of the mobile phone services. In some examples, the digital fingerprint may be phone use history, GPS location, and/or other information about the user device and use of the user device.

Furthermore, subverting or spoofing carrier injected headers is difficult because it is controlled by the carrier network. Therefore carrier injected headers are a particularly secure manner for sharing user information as it can be used to determine security risks.

Figure 1:
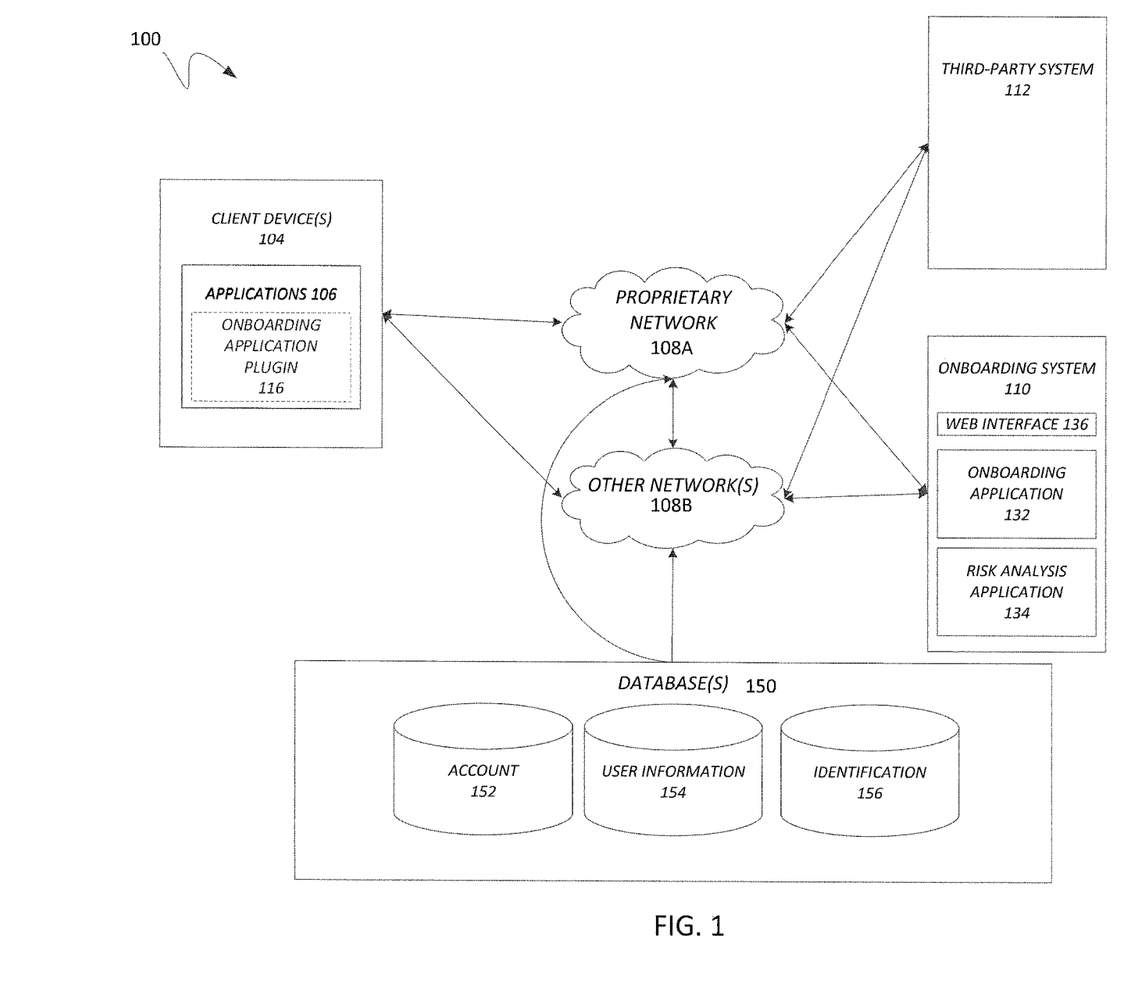
FIG. 1 is a block diagram of an exemplary computing environment that is adapted for user information management through header injections.

FIG. 1 illustrates, in block diagram format, an exemplary embodiment of a computing environment adapted for implementing a system for user information management through header injections. As shown, computing environment 100 may comprise or implement a plurality of servers, devices, and/or software components that operate to perform various methodologies in accordance with the described embodiments. Exemplary servers may include, for example, standalone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing environment 100 may include, among various devices, servers, databases and other elements, one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, or other similar mobile devices that a user may carry on or about his or her person and access readily.

Client devices 104 may include one or more system programs to perform various operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth.

Client devices 104 may include one or more applications, such as one or more applications 106. Exemplary application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), payment applications, social media applications, location-based services (LBS) applications (e.g., GPS, mapping, directions, positioning systems, geolocation, point-of-interest, locator), and so forth. One or more of applications 106 may display various graphical user interfaces (GUIs) to present information to and/or receive information from one or more users of client devices 104. In some embodiments, applications 106 may include one or more applications configured to conduct some or all of the functionalities and/or processes discussed below.

In some examples, one or more applications 106 may include an onboarding application component 116. Onboarding application component 116 may be utilized to interface and interact with an application on a remote server or system, such as onboarding application 132 of onboarding system 110, through one or more networks such as proprietary network 108A and/or other networks 108B. Proprietary network 108A and/or other networks 108B may be the Internet, a WAN, a WWAN, a WLAN, a mobile telephone network, a landline telephone network, personal area network, as well as other suitable networks and/or combination of several suitable networks. In some examples, onboarding application component 116 may cause client device 104 to communicate with onboarding system 110 using a particular communication protocol, such as the hypertext transfer protocol HTTP or other communication protocol. In some examples, onboarding application component 116 may cause client devices 104 to communicate with onboarding system 110 particularly through proprietary network 108A. In some examples, proprietary network 108A may be a carrier network that may be a proprietary network infrastructure belonging to a telecommunications server such as Verizon, AT&T, Sprint, and/or the like. In some examples, proprietary network 108A may inject a header, such as a custom HTTP header into an HTTP request, to some and/or all communications that client devices 104 conduct over proprietary network 108A. In some examples, the communications from client devices 104 to onboarding system 110 through proprietary network 108A may then be relayed through one or more other networks 108B, such as the Internet, before reaching onboarding system 110. In some examples, proprietary network 108A may relay the communications directly to onboarding system 110 in cases where onboarding system 110 is directly connected to proprietary network 108A.

In various embodiments, computing environment 100 may include, among other elements, a third-party system 112. In various implementations, third-party system 112 host applications associated with or employed by a third-party system 112. For example, third-party system 112 may enable onboarding system 110 to provide client devices 104 and/or onboarding system 110 with additional services and/or information, identifying information, some of which will be discussed in greater detail below. In some examples, third-party system 112 may be the same entity that owns, controls, and/or manages proprietary network 108A. In some examples, third-party system 112 may manage the injection of headers into communications that are conducted over proprietary network 108A, such as a custom HTTP header. In some examples, the injected headers may serve as an identifier for client devices 104. In some examples, identifier information in the headers may be linked, associated with, and/or serve as an identifier for user information associated with client devices 104 (e.g. information about who is paying for or has signed up for access to proprietary network 108A for one or more of client devices 104). Third-party system 112 may also provide onboarding system 110 and/or client 102 with other information and/or services, such as email services and/or information, communication services and/or information, messaging services, and/or information, and/or the like. In some examples, third-party system 112 may include one or more servers for aggregating user data, communication data, and/or other statistics and information.

In some examples, onboarding system 110 may comprise one or more communication interfaces that enable communication with onboarding system 110 via proprietary network 108A and/or one or more other networks 108B. In some examples onboarding system 110 may comprises one or more servers and applications to provide various online services. In some examples, onboarding system 110 may comprises web servers, API servers, messaging servers, application servers and/or the like.

In some examples, onboarding system 110 may utilize the one or more servers to provide a web interface 136. In some examples, web interface 136 may be a front end application that may facilitate interactions between a web browsing application on client devices 104 and onboarding application 132.

In some examples, onboarding system 110 may operate, through one or more servers, onboarding application 132. Onboarding application 132 may be a backend application that may be configured to conduct one or more of the operations for identifying and authenticating users of client devices 104. In some examples, onboarding application 132 may be configured to communicate with one or more applications, such as application 106 of client devices 104, one or more applications of third-party system 112, web interface 136, risk analysis application 134, and/or other applications.

Computing environment 100 may include one or more databases 150 which may be part of, managed, accessed, and/or operated by one or more of client devices 104, third-part system 112, and/or onboarding system 110. In some examples, client devices 104, third-party system 112, and/or onboarding system 110 may have copies or maintain their own versions of one or more databases similar to databases 150. In some examples, one or more of the databases within databases 150 may be configured physically and/or by software to limit access to certain servers, systems, and/or devices. In some examples, databases 150 may include, among other possible databases, account database 152, user information database 154, identification database 156, and/or the like. Databases 150 generally may store and maintain various types of information and may comprise or be implemented by various types of computer storage devices (e.g., servers, memory) and/or database structures (e.g., relational, object-oriented, hierarchical, dimensional, network) in accordance with the described embodiments.

While the embodiment of FIG. 1 illustrates a computing environment 100 deployed in a three-party operating environment with a certain split of operations by each system or device, it is to be understood that other suitable operating environments and/or architectures with other splits of operations may be used in accordance with the described embodiments.

Figure 2:
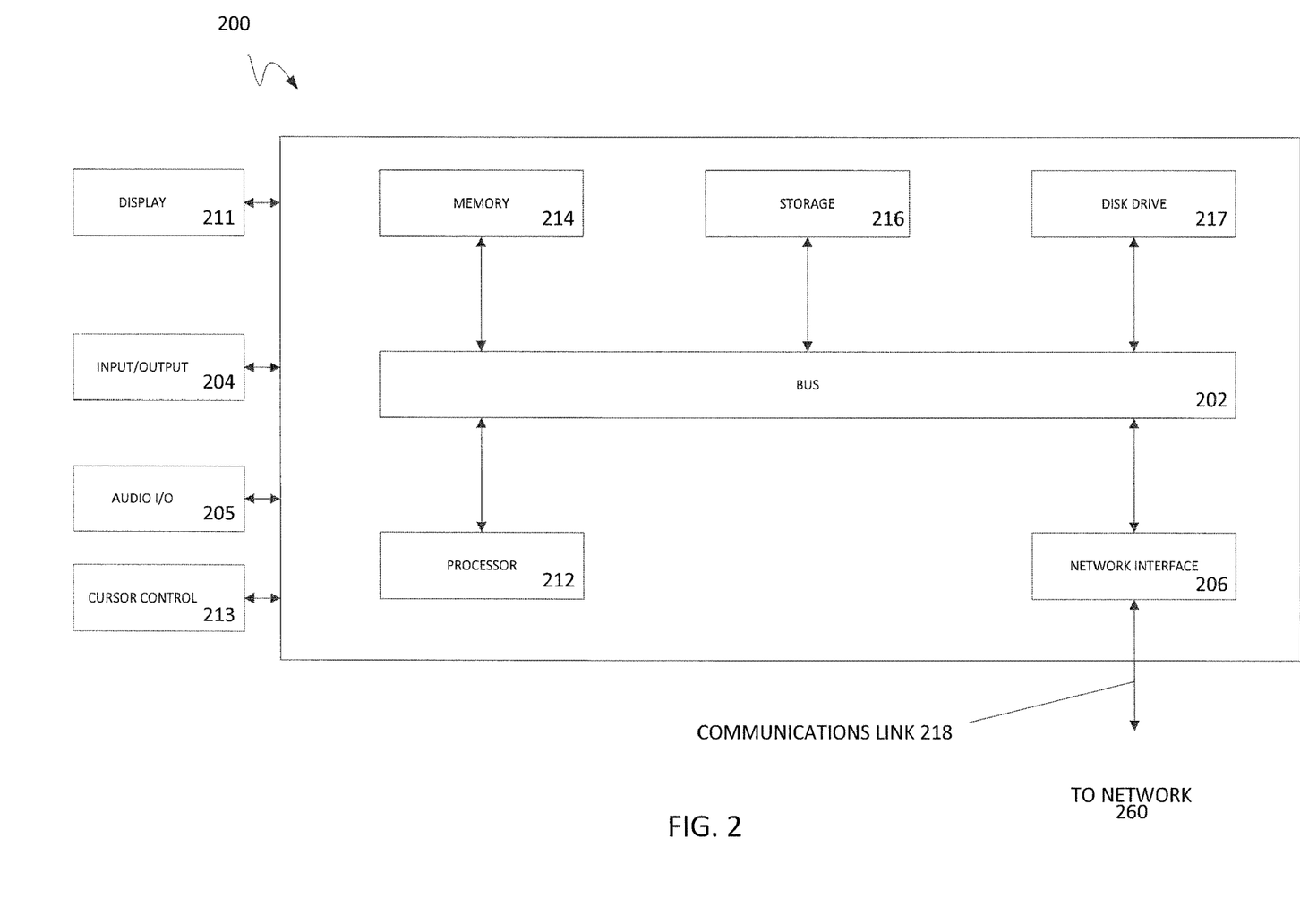
FIG. 2 is a block diagram of an exemplary computer system suitable for implementing one or more devices of the computer environment in FIG. 1.

FIG. 2 illustrates an exemplary computer system 200 in block diagram format suitable for implementation on one or more devices of the computing devices and system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows.

Additionally, as more and more devices become communication capable, such as new smart devices using wireless communication to report, track, message, relay information and so forth, these devices may be part of computer system 200. For example, windows, walls, and other objects may double as touch screen devices for users to interact with. Such devices may be incorporated with the systems discussed herein.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touchscreen, etc.). In some examples, I/O component 204 may include an image sensor for capturing images and/or video, such as a complementary metal oxide semiconductor (CMOS) image sensor, and/or the like. An audio input/output component 205 may also be included to allow a user to use voice to input information by converting audio signals. Audio I/O component 205 may allow the user to hear audio. A transceiver or network interface 206 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, images, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
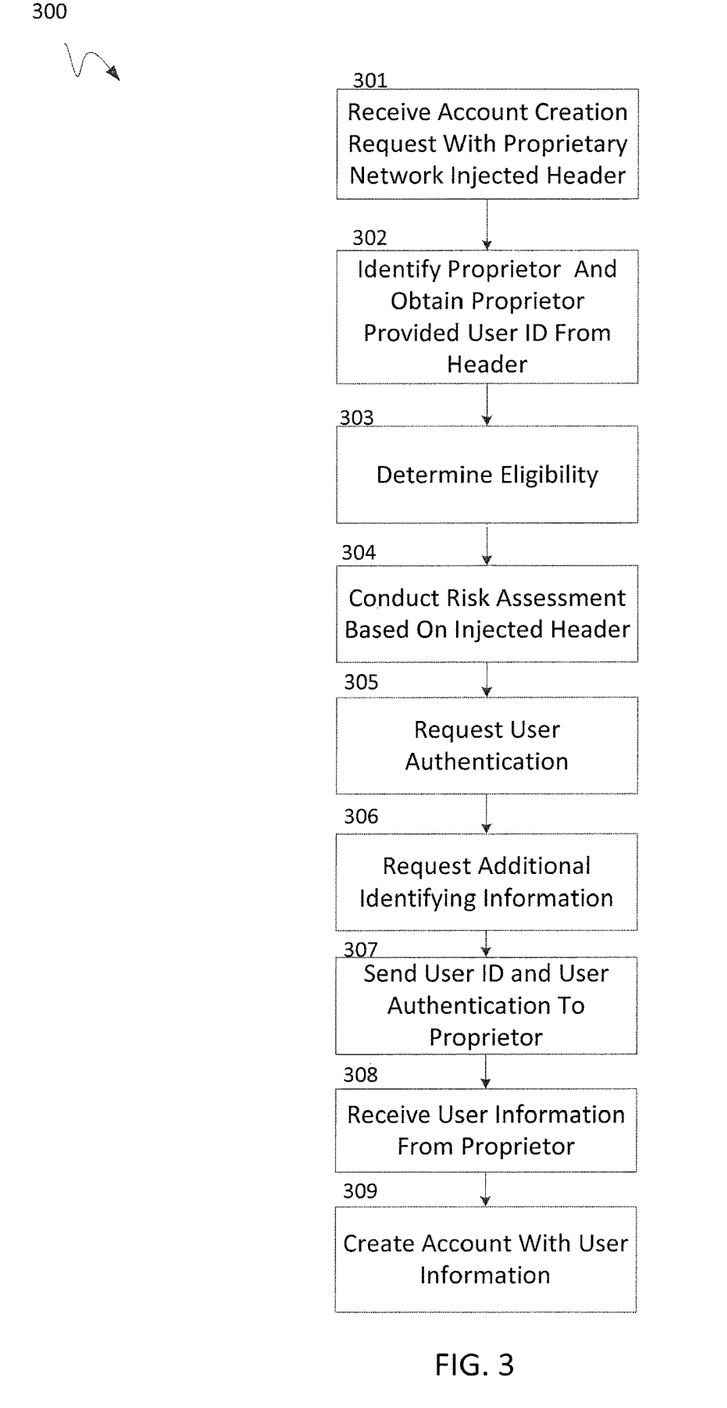
FIG. 3 is a flow diagram illustrating an exemplary process for carrier assisted onboarding.

FIG. 3 illustrates exemplary process 300 for carrier assisted onboarding. According to some embodiments, process 300 may be implemented on one or more devices and or systems in computing environment 100 of FIG. 1. In some embodiments, process 300 may include one or more of operations 301-309, which may be implemented, at least in part, in the form of executable code stored on non-transitory, tangible, machine readable media that, when run on one or more processors, may cause a system to perform one or more of operations 301-309. Although the operations shown in this example are in a particular order, other orders are contemplated and some operations may be combined or omitted.

In some examples, process 300 may include operation 301 wherein the system may receive a request from a client device, such as one of the client devices 104 of FIG. 1. For example, the system may receive an account creation request. In some examples, the client device may send a request to sign up for an account with a service provider, such as a social media website or an online payment application, through a proprietary network, such as a mobile carrier network. In some examples, the client device may send a request using a native application on the client device with an onboarding application component, such as one or more of applications 106 using onboarding application component 116 of FIG. 1. In some examples, the client device may send the request by using a webpage through a web browser application. For example, application 106 of FIG. 1 may be a web application, and the user may navigate to a web page or address associated with an account signup page, such as web interface 136 of FIG. 1. In some examples, the request may be sent through a proprietary network, such as proprietary network 108A of FIG. 1. In some examples, the request may be handled by a webpage, web application, or web interface, wherein the user device interacts with the requesting application through a network, such as proprietary network 108A.

In some examples, when a client device sends a request or other form of communication to the system over a proprietary network, the proprietary network may inject a header into the communications and/or request. For example, a client device may send an account creation request to the system through a native application over a proprietary network and the proprietary network may inject a header into the account creation request before relaying the request to the system. In some examples, such as when a web application is handling the request, the web application may identify the injected header from the communications received from the client device (through the proprietary network) and forward it to the system with the account creation request. In some examples, the communications conducted between the client device, web application, and the system may be conducted using HTTP, and the injected header may be an HTTP header. In some examples, this feature may be conducted through header enrichment. The system may then receive the account creation request and the injected header at operation 301. The injected header may include information such as an identifier of the proprietary network, an identifier for the user or client device, network subscription type (e.g. monthly subscription, prepaid, corporate plan, family plan, data plans, text or SMS plans, and/or the like), and/or other information about the user, network service provider, proprietor, the device and/or the like. Some of the other information may be a GPS location, whether the device is stolen, how old the device is, how long the device or user associated with the device has had an account with the proprietary network, IP addresses, MAC addresses, and/or other information. In some examples, some of the other information may come from the client device as part of the account creation request. Additionally, the client device may provide and the system may receive, at operation 301, information about the device, such as its location, usage, battery life, serial number, phone number, carrier information, whether the device has a sim card, how many times the device has changed sim cards, whether the device is locked, where the device originated or was manufactured, and/or the like. In some examples, some of this information may be collected and provide by the proprietor through header injection. The system may also receive, at operation 301, information about an application being used to conduct the account creation and information about the type of account being created.

In some examples, process 300 may include operation 302. At operation 302, the system may identify the proprietor of the proprietary network based on information received at operation 301. In some examples, the proprietor may be determined based on the format of the injected header (order in which information is provided, size of the header, the format of a particular data entry in the header, etc.). In some examples, the proprietor may provide an identifier for the proprietor in the injected header. In some examples, the proprietor may be determined based on user device information received. For example, a user device may have provided an identifier, such as a name or code, associated with the network communications service the user device is subscribed to.

In some examples, the user device may provide a phone number, and the phone number can be used to determine the proprietor. In some examples, the wireless bands and/or frequencies used by the device for network communications may be provided, and the system may determine the proprietor based on the band and/or frequency used. This is possible because some carrier networks have assigned frequencies and/or bands.

Additionally, in some examples, the system may extract a proprietor provided user identifier from the injected header. The proprietor provided user identifier may be a user identifier that the proprietor may use to identify the device and/or user associated with the device. In some examples, the proprietor provided user identifier may be a mobile subscriber integrated service digital network (MS-ISDN) number.

In some examples, process 300 may include operation 303. At operation 303, the system may determine whether the device is eligible for carrier assisted onboarding. A device may or may not be eligible for carrier assisted on boarding based on one or more factors such as the type of device, the type of subscription that the device has with the proprietor, whether the device is currently roaming, and/or whether the proprietary network used for communication is suitable for carrier assisted onboarding. For example, in some cases, the system may be configured to not allow devices on a family subscription plan to use carrier assisted onboarding. In some cases, the system may be configured to deny use of the carrier assisted onboarding system if the device is on a business plan. In some examples, the conditions may depend on the country that the user device is registered in or the country associated with the proprietary network. For example, a user device that has a subscription to a proprietary network through a family plan wherein the subscription was made in France may be allowed to conducted carrier assisted onboarding, but a user device that has a subscription to the proprietary network through a family plan wherein the subscription made in the United States may be denied from conducting carrier assisted onboarding. As such, process 303 may determine whether sufficient conditions are met such that the user device is eligible to continue with other operations of process 300. The conditions may include but are not limited to, the network carrier associated with the device, the network used for communication, information in the injected header, user information, device information, device location, country associated with the subscription, and/or the like. Some or all of this information may be requested and retrieved from the user device or carrier of the proprietary network without user interaction.

Furthermore, in some examples, the system may conduct a risk analysis to determine whether a device is eligible for carrier assisted onboarding. In some examples, information that may be used for determining risk may be the device serial number, device location history, which may be provided as a log of GPS locations, and/or the like. In some examples, risk may be determined based on a location heat map of the user device, such that a better risk score is given for when the device is currently located in an area that is hot (which represents places the user device has been frequently or near places that are frequented) on the heat map and a lower or negative risk score for when the device is located in an area that is cold (e.g. rare and/or new).

In some examples, process 300 may include operation 304, wherein the system may conduct a risk assessment based on information retrieved from the injected header, other information received associated with the user device, and/or information about the application being used. In some examples, the risk assessment may be different or even skipped depending on how the carrier onboarding system is being used. For example, a more stringent and/or rigorous risk assessment may be conducted when the onboarding is being used for an application associated with financial transactions and/or information. In some examples, a more stringent and/or rigorous risk assessment may require passing more criteria than a less stringent and/or rigorous risk assessment. In some examples a threshold risk assessment value may change such that it is more difficult for the device to be eligible for carrier assisted onboarding when the system conducts a risk assessment (e.g. a higher risk assessment value threshold for eligibility).

In some examples, the system may determine that the client device is attempting to sign up for an account unassociated with anything financial. In such an example, the system may not conduct a risk assessment at all. In contrast, if the system determines that the carrier assisted onboarding is used for a payment transfer application, the system may conduct several risk assessments, ensure one or more criteria are met, and/or have a threshold risk score that must be overcome. For example, one criteria may be that the GPS location received from the user device at operation 301 matches the location of an area code for a phone number received at operation 301, which may be extracted from the injected header. Another criteria may be that the number of hops made in one or more networks before the system received the information at operation 301 is below a certain number, or that the hops were not located in certain countries.

In some examples, such as when a threshold risk score is used for risk assessment, one or more criteria may be given predetermined positive and/or negative scores. Based on whether the criteria is met, the system may combine (through addition or subtraction) the associated scores to determine a risk value for the device. The resultant score may be compared with a threshold risk score to determine whether the device passes the risk assessment. For example, if the resulting score is above or equal to the threshold risk score, the system may allow usage of process 300 for account signup, otherwise, the system may terminate the carrier assisted account signup. The threshold risk score may be dependent on the type of application or service that the client device is signing up for. In some examples, terminating a carrier assisted account signup may cause the associated application to revert to a manual account signup flow. Assuming the risk assessment is passed at operation 304, if conducted at all, the system may continue to other operations of process 300.

In some examples, process 300 may include operation 305. At operation 305, the system may send a request to the user device or cause an application to request authentication information. User authentication information may be a piece of information associated with the user of the user devices that the proprietor may have a record of. For example, user authentication may include a pin number that the user provided to the proprietor, a billing zip code, parts of a social security number, parts of a payment instrument, a password, username, email address, and/or the like. When a response to the authentication request is received, the system may continue to other operations of process 300. In some examples, operation 305 may also have a consent form that the user will have to sign, agree to, and/or respond to. This consent form may be a consent form associated with the proprietor and/or another entity. In some examples, the system may select the consent form request based on the identified proprietor and/or entity. The consent form may provide permission to an entity, such as the proprietor, to share personal information of the user of the client device with the system or an entity associated with the system.

In some examples, process 300 may include operation 306, wherein the system may request additional identifying information. In some examples, operation 306 may be conducted concurrently with operation 305. In some examples, this additional identifying information may be information that the proprietor does not have record of, such as a driver's license number, account information that may be verified with another service prover, passport number, CCV, and/or the like. In some examples, this operation may occur when the risk assessment at process 304 was not passed and/or if certain criteria were met/not met. For example, if the GPS location of the device was in a certain country or state, the system may request driver's license information and look for driver's license information that has a matching country or state. In some examples, operation 307 may be used in lieu of the client device passing the risk assessment at operation 304. In some examples, operation 305 may be used to gather additional user data for future references. In some examples, operation 305 may implement a bot deterring information request to ensure that there is a human operator. In some examples, the information request may be similar to that of Captcha®.

In some examples, process 300 may include operation 307. The system at operation 307 may send, directly and/or through a third-party, the proprietor-provided user ID obtained at operation 302 and the authentication information and completed consent form obtained at operation 305 to the proprietor. This information may be sent to the proprietor as part of a request for user information to use in signing up for an account. In some examples, the system may send a request to the proprietor for information about a user associated with the user ID and authentication information. Furthermore, the proprietor may use the user ID, authentication information, and consent form as authorization from the user that the proprietor can share its information about the user with the system.

In some examples, process 300 may include operation 308. At operation 308, the system may receive a response to the request sent at operation 307. In some examples, the response may be the requested user information. In such cases, the system may continue to other operations of process 300. User information may include information such as name, address, username, password, and/or financial instrument information (e.g. credit card number, banking institution, cvv number, routing and account number for a bank account, and/or the like).

In some examples, the response may be that the information provided was incorrect or that the request was denied. In such a case, the carrier assisted onboarding process may be terminated or may cause the user device to redirect to a manual user information entry page.

In some examples, process 300 may include operation 309. Operation 309 may take the user information received at operation 308 and auto-populate the user account creation form associated with the account creation request. In some examples, the system may request the user to check to ensure the auto-populated data is correct or make edits to the auto-populated data. In some examples, operation 309 may create the account based on the information received at operation 308.

Although process 300 is discussed in context of signing up for a user account, it is contemplated that process 300 may be adapted for conducting transactions. For example, the proprietary network may have financial information of the user and one or more operations of process 300 may be used to obtain financial information as the user information of such user for conducting a transaction. In some examples, the system may handle obtaining transaction information from the proprietor (such as a wireless carrier) and conduct a transaction for the user without the user having to enter financial information into the user device. In some examples, this operation may take place instead of operation 309.

In some examples, one or more operations may be omitted. For example, operation 305 and 306 may be omitted such that a user does not manually enter any information. In some examples, different operations may be performed in place of one or more operations. For example, instead of receiving a request to create an account at operation 301, the system may receive a transaction request to transfer funds to a merchant as part of a purchase. One or more of process 302-308 may be used to obtain financial information about the user, and the system may then use the financial information to handle the transaction with the merchant.

Furthermore, in some examples, the system may use the information received from the proprietor to improve user data quality that is held natively in the system. For example, the system may have a database of user information, and the information received from the proprietor at operation 308 may be used to double check that the information is correct or to add and/or update additional information about a client device or user that the system does not have.

In some examples, the information received at operation 308 may be used to conduct a risk assessment on the user for underwriting loans, setting interest rates, determining size of credit to provide, and/or the like. For example, the system may receive information about how long the user has had an account with the proprietor, where the user lives, whether the user pays their bills on time, and/or the like.

As discussed above, one or more of operations 301-309 may be conducted in different orders, combined with other operations, and/or omitted. For example, in some embodiments, operation 304 may be conducted after operation 308 wherein the system receives the user information from the proprietor. In this manner, the risk assessment at operation 304 may be conducted with both the information received at operation 301 and the user information received at operation 307. The system may check for continuity of information or other information, such as comparing the location of the user device received at operation 301 with one or more locations associated with the user information at operation 308. If the risk assessment fails, the system may not continue to operation 309 and/or decline to share the user information with another system or device.

Figure 4:
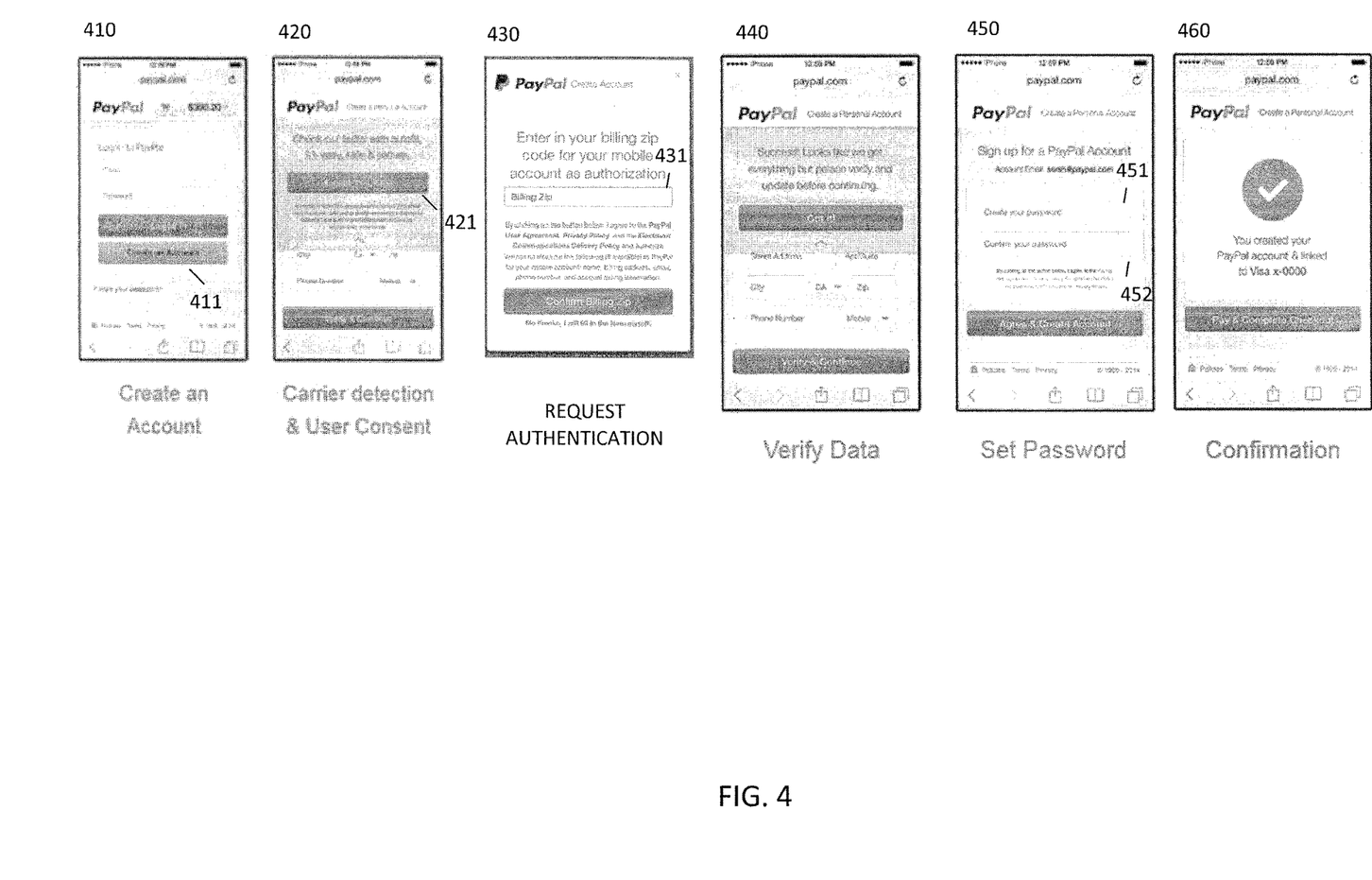
FIG. 4 is an exemplary front end user experience flow that may be implemented with carrier assisted onboarding.
Figure 5:
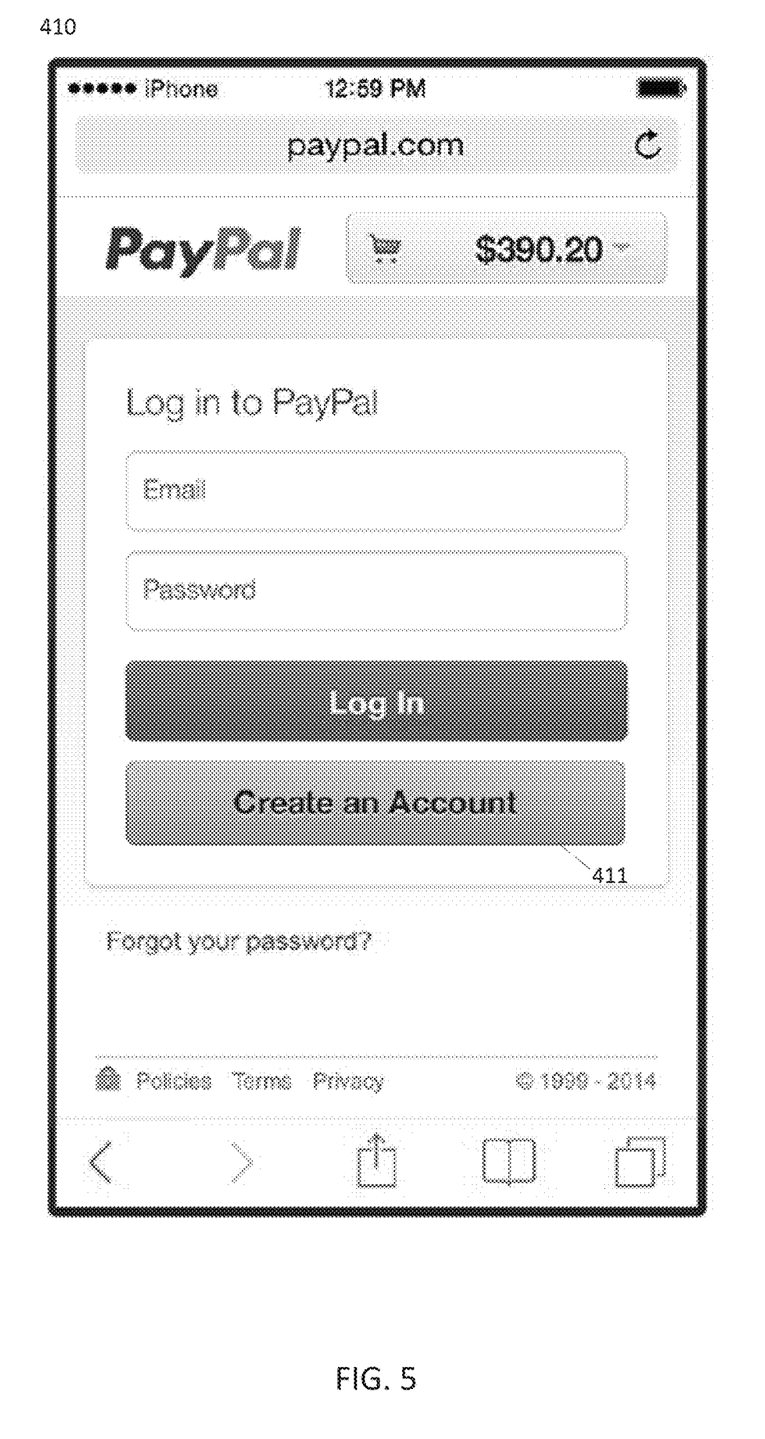
FIG. 5 is a larger image of display page 410 of FIG. 4.
Figure 6:
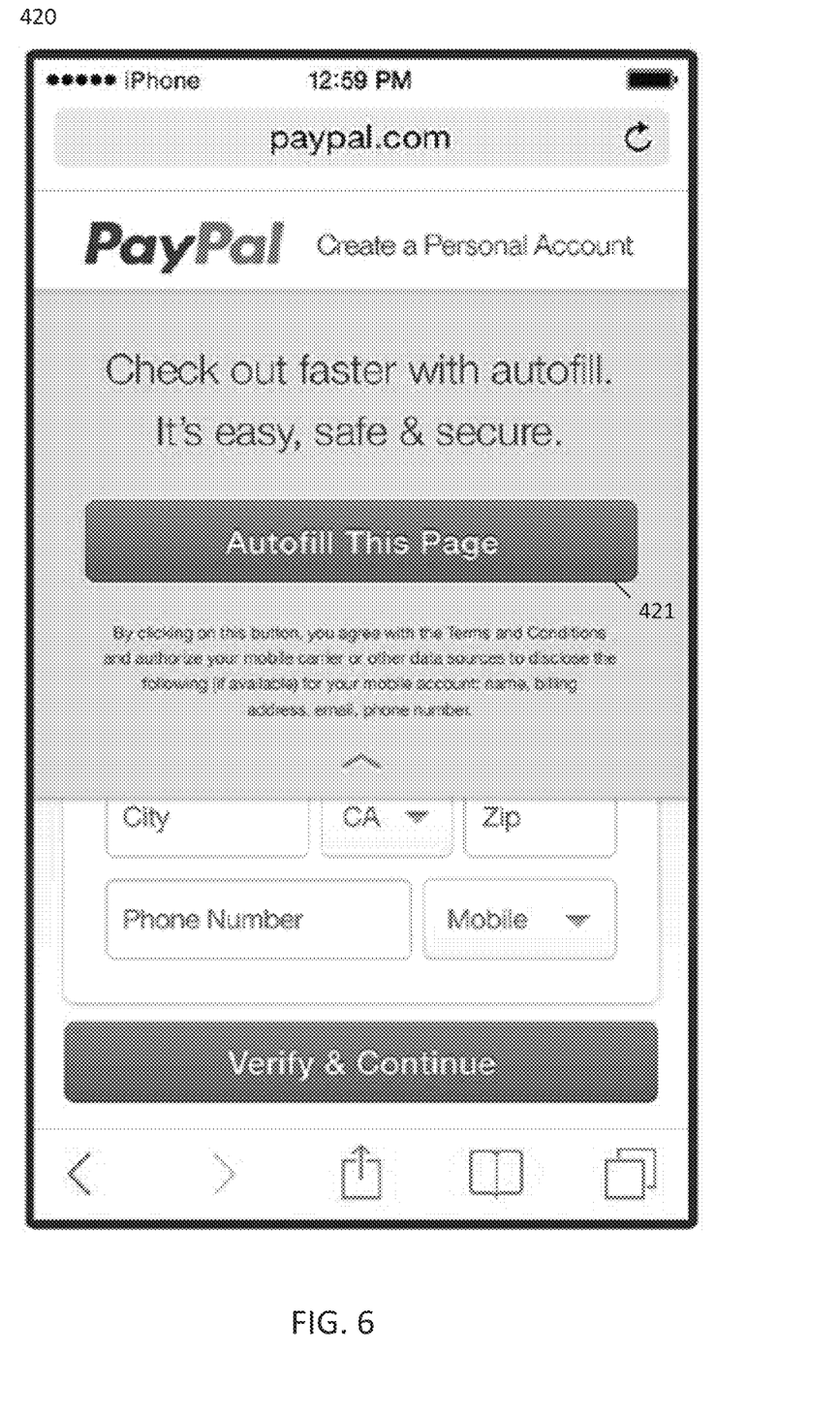
FIG. 6 is a larger image of display page 420 of FIG. 4.
Figure 7:
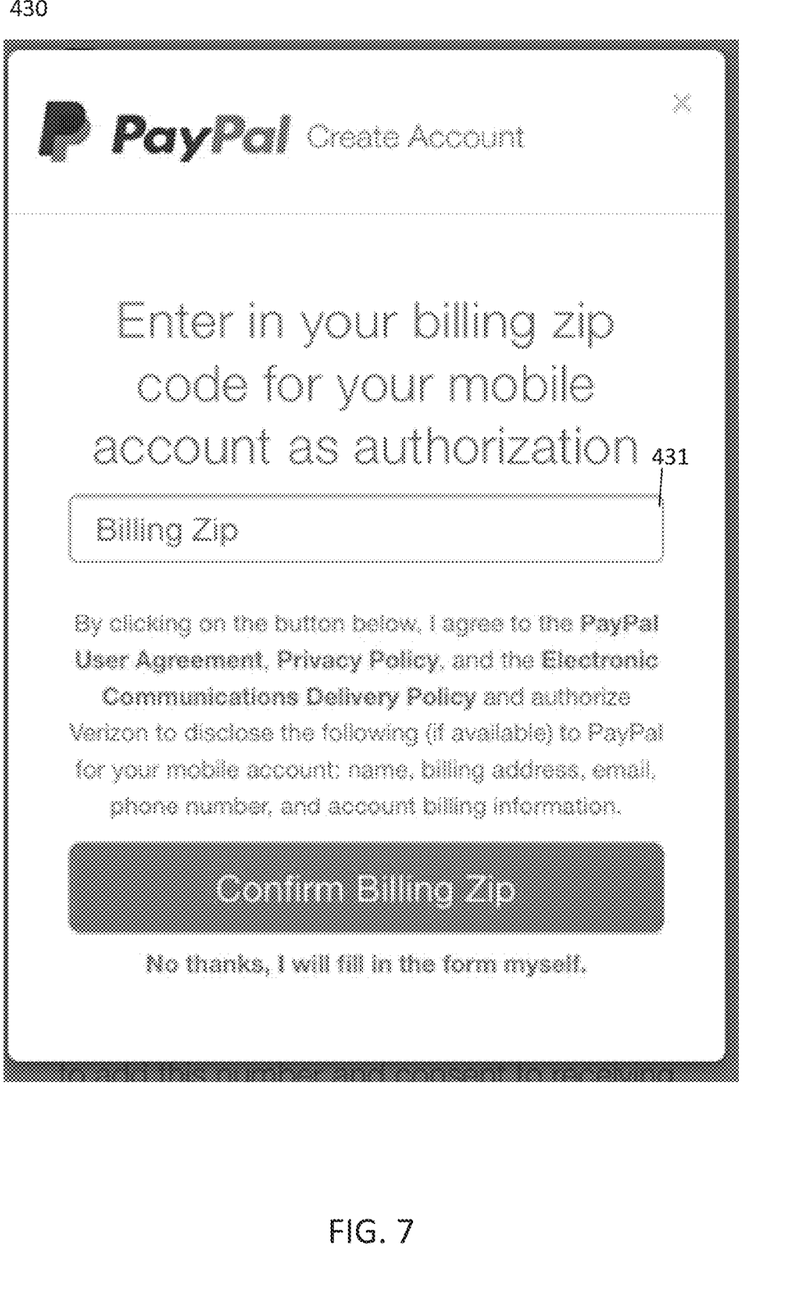
FIG. 7 is a larger image of display page 430 of FIG. 4.
Figure 8:
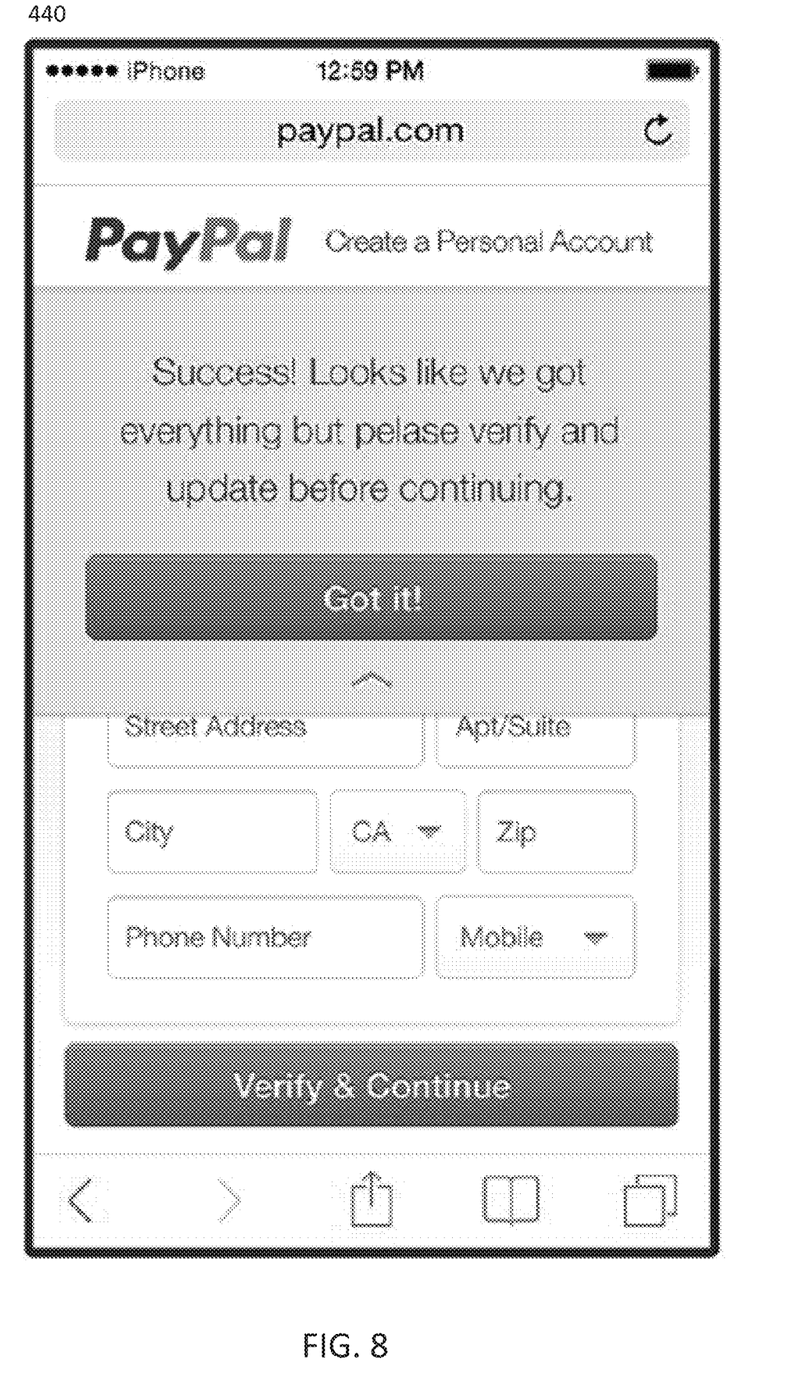
FIG. 8 is a larger image of display page 440 of FIG. 4.
Figure 9:
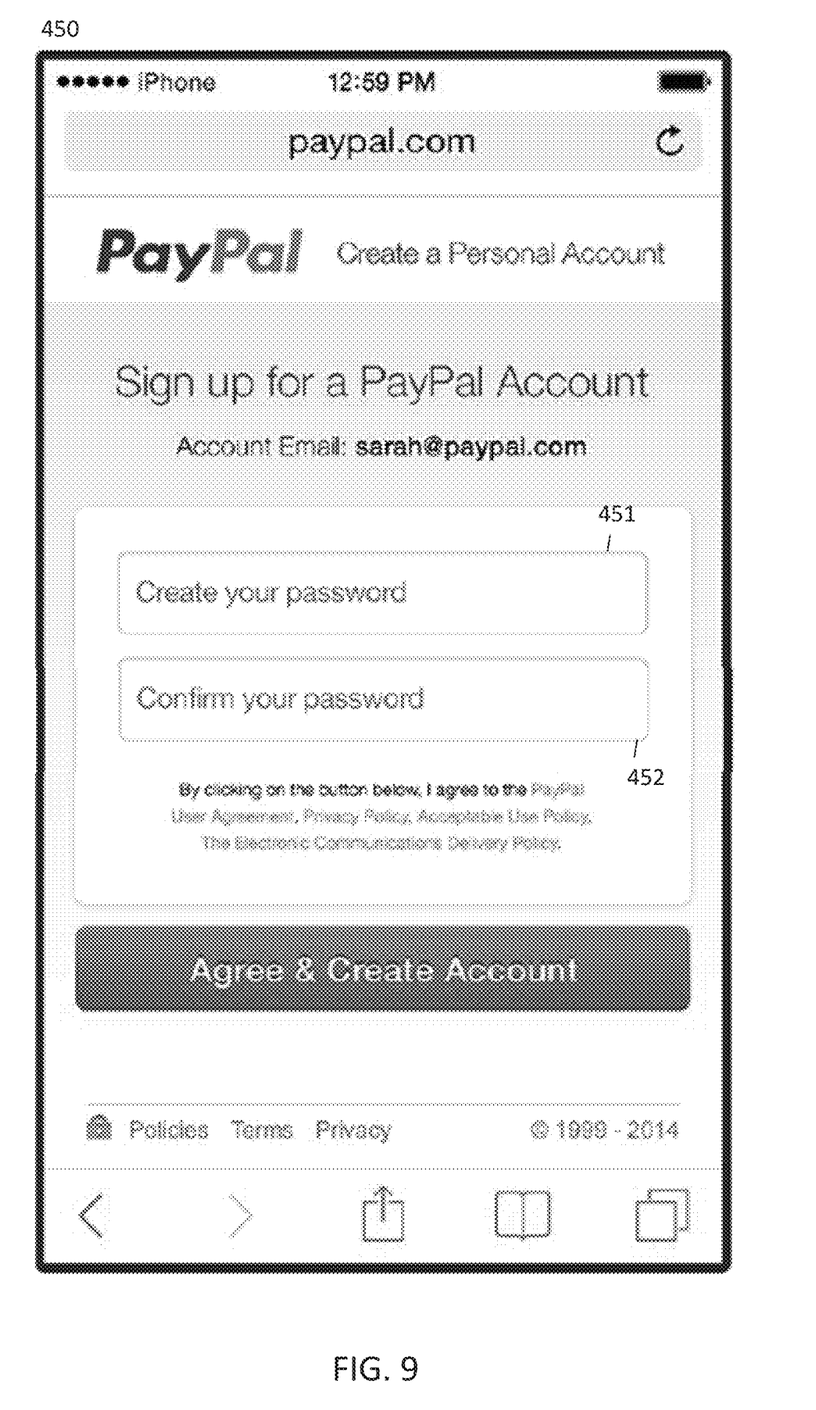
FIG. 9 is a larger image of display page 450 of FIG. 4.
Figure 10:
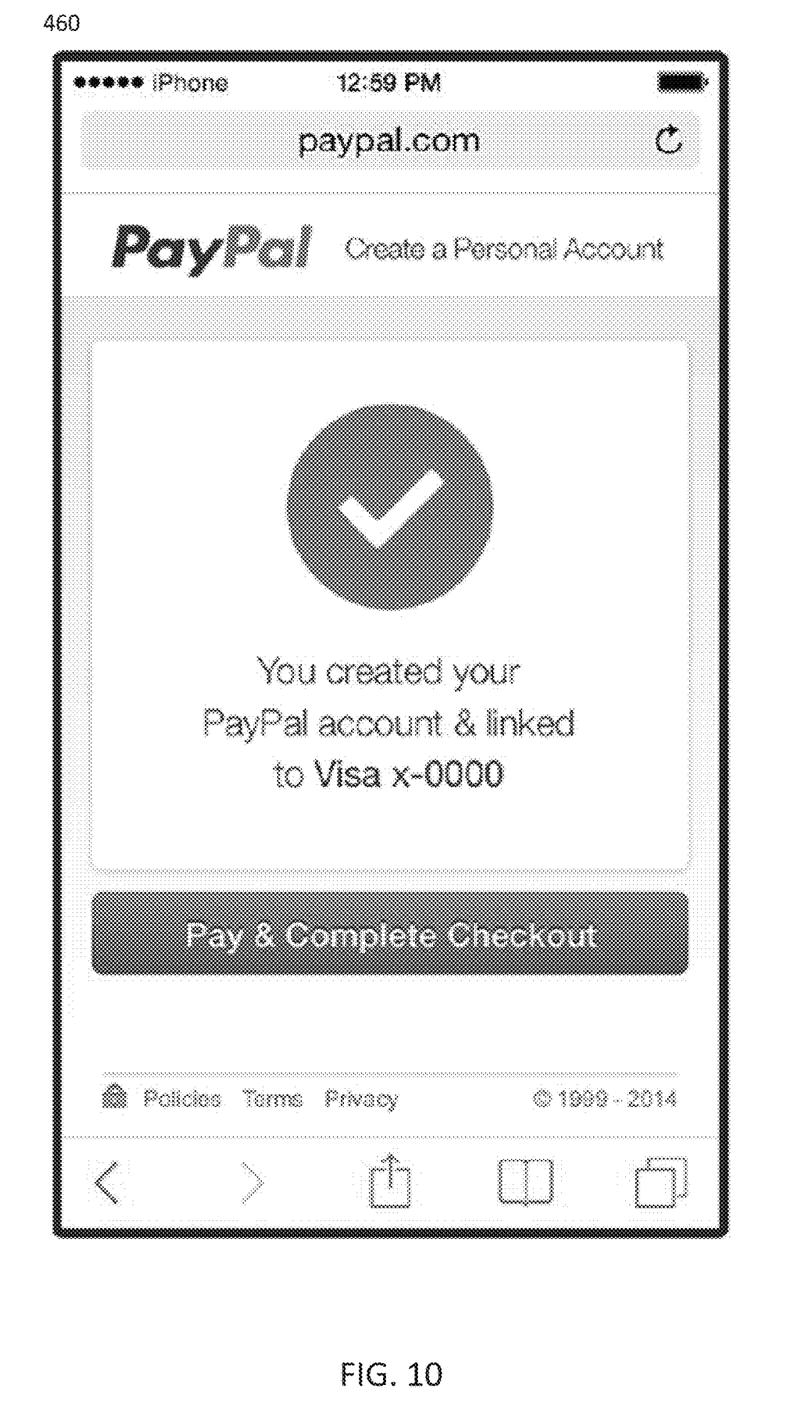
FIG. 10 is a larger image of display page 460 of FIG. 4.

FIG. 4 illustrates an exemplary front end GUI and experience that a user may have through an exemplary implementation of carrier assisted onboarding discussed herein. At one part of the experience, a flow of an application, web interface, or other widget may display an account login page 410 with the option to create an account using button 411. A user may actuate the create-an-account button 411 to trigger the account creation flow. In response to the triggering of the account creation flow, the application may cause the device or system running the front end GUI to send an account creation request to one or more system, such as a system implementing process 300 of FIG. 3. In some examples, the request may be an HTTP communication or other communication protocol purposely sent over a proprietary network with some of the information discussion in operation 301. In some examples, the request may be formatted such that the request may have additional headers injected to the request by the proprietary network, such as an MS-ISDN.

In response to the application determining that carrier assisted onboarding is available, consent page 420 may be displayed. In some examples, the determination whether carrier assisted onboarding is available may be determined through a back end application that may be implementing a process similar to process 300. For example, one or more operations 301-304 (and possibly other operations) of FIG. 3 may have occurred in a back end application integrating with the front end application, providing the front end GUI experience depicted in FIG. 4.

In response to receiving consent, which may be an actuation of button 421, the front end GUI and experience may display authentication request page 430. In some examples, the front end application operating the GUI may relay the consent to another application, such as a backend application running process 300. In some examples, the consent may be a more rigorous process, such as requesting a signature (which may be conducted through a touch screen).

In some examples, authentication request page 430 may be displayed in response to receiving the consent on page 420. In some examples, page 430 may also be used to establish consent. Page 430 may include a data entry field 431 for entering authentication information. In this example, the authentication information is a billing zip code. Other examples may request other forms of authentication information. In some examples, page 430 may be the front end experience resulting from operation 305 of FIG. 3.

In response to receiving the authentication information and the back end application authenticating the user, page 440 may be shown. Page 440 may display the user information used for the new account sign up. The user information may be prepopulated by the front end application handling the user experience or by a backend system. In this example, page 440 will allow a user to edit, correct, and/or verify the user's information.

In some examples, the front end application may display page 450 for additional account creation information. For example, some accounts may be customizable by having a customized username and/or password. Page 450 may have entry fields 451 and 452 for providing and confirming a password for the newly created account. In some examples, the username may default to an email address or other information received as part of the carrier assisted onboarding process.

Furthermore, the front end application may display page 460 indicating a successful creation of a new account. In some examples, the account may be linked with a financial instrument, and display page 460 may provide an indicator of which financial instrument was used to sign up with the account.

FIGS. 5-10 are enlarged forms of pages 410-460 of FIG. 4 such that the wording and style of the pages or more clearly presented.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising: a non-transitory memory storing instructions; and one or more hardware processors coupled to the non-transitory memory and configured to read the instructions from the non-transitory memory to cause the system to perform operations comprising: receiving, from an application interacting with a user device over a carrier network, a first request for user information, wherein the first request comprises a header enrichment and information associated with the user device, wherein the information comprises a number of times the user device has switched owners; receiving authentication information from the application, wherein the authentication information authorizes the application to receive the user information; extracting an identity of the carrier network from the first request for the user information; extracting a carrier-provided user identifier from the header enrichment; determining the application that sent the first request; calculating a risk value based, at least in part, on the information in the first request associated with the user device including, at least in part, the number of times the user device has switched owners; determining a risk threshold based on the application; determining that the risk value passes the risk threshold by comparing the risk value to the risk threshold; in response to determining that the risk value passes the risk threshold sending, to a system of the carrier network, a second request for user information, the carrier-provided user identifier, and the authentication information; receiving, from the system of the carrier network, the user information in response to the second request for user information; and responding to the first request for the user information with the user information transmitted to the application.

2. The system of claim 1, wherein the risk threshold is based, at least in part, on whether the application is capable of conducting a financial transaction.

3. The system of claim 1, wherein the risk threshold is based, at least in part, on whether the first request for the user information further includes a request for financial information.

4. The system of claim 1, wherein the information about the user device further comprises a type of subscription the user device has with the carrier network, and wherein the risk threshold is based at least in part on the type of subscription.

5. The system of claim 1, wherein the risk threshold is based, at least in part, on a location that the carrier network is associated with.

6. A computer implemented method comprising: receiving, from an application interacting with a user device over a carrier network, a first request for user information, wherein the first request comprises a header enrichment and information associated with the user device, wherein the information comprises a number of times the user device has switched owners; receiving authentication information from the application, wherein the authentication information authorizes the application to receive user information; extracting an identity of the carrier network from the first request for the user information; extracting a carrier-provided user identifier from the header enrichment; identifying the application that sent the first request based on the information in the first request; sending, to a system of the carrier network, a second request for the user information, the carrier-provided user identifier, and the authentication information; receiving, from the system of the carrier network, the user information in response to the second request for user information; determining a risk value based, at least in part, on the information in the first request associated with the user device including, at least in part, the number of times the user device has switched owners, and the user information; determining a risk threshold based on the application; determining that the risk value passes the risk threshold; and responding to the first request for the user information with the user information transmitted to the application in response to determining that the risk value passes the risk threshold.

7. The method of claim 6, wherein the first request further comprises location information for the user device and wherein the risk value is determined based, at least in part, on the location information of the user device and the location information in the user information.

8. The method of claim 6, wherein the risk threshold is based, at least in part, on whether the application is capable of conducting a financial transaction.

9. The method of claim 6, wherein the risk threshold is based at least in part on whether the first request for the user information includes a request for financial information.

10. The method of claim 7, wherein the information about the user device further comprises a type of subscription the user device has with the carrier network, and wherein the risk threshold is based, at least in part, on the type of subscription.

11. The method of claim 6, wherein the risk threshold is based, at least in part, on a location that the carrier network is associated with.

12. A non-transitory machine readable medium having stored thereon machine readable instructions executable to cause a machine to perform operations comprising: receiving, from an application interacting with a user device over a carrier network, a first request for user information, wherein the first request comprises a header enrichment injected into the first request by the carrier network and information associated with the user device, wherein the information comprises a number of times the user device has switched owners; receiving authentication information from the application, wherein the authentication information authorizes the application to receive the user information; determining an identity of the carrier network based on the first request for the user information; determining a carrier-provided user identifier from the header enrichment; determining the application that sent the first request; sending, to a system of the carrier network, a second request for the user information, the carrier-provided user identifier, and the authentication information; receiving, from the system of the carrier network, the user information in response to the second request for the user information; determining a risk value based, at least in part, on the information in the first request associated with the user device including, at least in part, the number of times the user device has switched owners, and the user information; determining a risk threshold based on the application; determining that the risk value passes the risk threshold; and responding to the first request for the user information with the user information transmitted to the application in response to determining that the risk value passes the risk threshold.

13. The non-transitory machine readable medium of claim 12, wherein the first request comprises location information for the user device and wherein the risk value is determined based, at least in part, on the location information of the user device and the location information in the user information.

14. The non-transitory machine readable medium of claim 12, wherein the risk threshold is based, at least in part, on whether the application is capable of conducting a financial transaction.

15. The non-transitory machine readable medium of claim 12, wherein the risk threshold is based, at least in part, on whether the first request for the user information includes a request for financial information.

16. The non-transitory machine readable medium of claim 13, wherein information about the user device comprises a type of subscription the user device has with the carrier network, and wherein the risk threshold is based, at least in part, on the type of subscription.

* * * * *